United States Patent [19]

Terui

[11] Patent Number: 4,933,703
[45] Date of Patent: Jun. 12, 1990

[54] AUTOMATIC EXPOSING APPARATUS

[75] Inventor: Nobuhiko Terui, Ichikawa, Japan

[73] Assignee: Nikon Corporation, Tokyo, Japan

[21] Appl. No.: 424,502

[22] Filed: Oct. 20, 1989

[30] Foreign Application Priority Data

Oct. 25, 1988 [JP] Japan .................................. 63-268907

[51] Int. Cl.⁵ ............................................... G03B 7/08
[52] U.S. Cl. ....................................... 354/412; 354/446;
354/456; 354/173.1
[58] Field of Search ............. 354/412, 446, 456, 173.1,
354/173.11, 441, 442

[56] References Cited

U.S. PATENT DOCUMENTS

| | | | |
|---|---|---|---|
| 3,813,681 | 5/1974 | Sahara | 354/173.11 |
| 3,827,067 | 7/1974 | Yamamichi | 354/412 |
| 3,852,779 | 12/1974 | Yamamichi et al. | 354/412 |
| 4,182,557 | 1/1980 | Date et al. | 354/412 |
| 4,482,236 | 11/1984 | Tsuzuki et al. | 354/412 |

*Primary Examiner*—W. B. Perkey
*Attorney, Agent, or Firm*—Shapiro and Shapiro

[57] ABSTRACT

There is provided an automatic exposure control apparatus of a camera, comprising: a winding-up device to wind up a film after completion of the photographing; an output device to output an exposure start signal with respect to completion of the winding-up operation of the film; an exposure determining device to determine an exposure control value in response to the exposure start signal; and an exposure control unit to execute the exposure control of the camera on the basis of the exposure control value determined, wherein the exposure control unit previously stores at least one or more first exposure control value before the first photographing and, when the second photographing is executed before a second exposure control value is determined in response to the first exposure start signal which is output with respect to the first winding-up operation after the first winding-up operation was completed, the exposure control unit executes the exposure control by the first exposure control value.

6 Claims, 6 Drawing Sheets

AUTOMATIC EXPOSING APPARATUS

BACKGROUND OF THE INVENTION

1. Field of the Invention

The present invention relates to an automatic exposure control of a camera and, more particularly, to a combination of a motor drive unit and an automatic exposure control of a single-lens reflex camera.

2. Related Background Art

Hitherto, in the single-lens reflex camera, in the case of realizing high speed continuous photographing operations by using a motor drive unit, after a main mirror fell down after completion of the exposure in a preceding shot, the apparatus waits until the vibration of the mirror is settled and, thereafter, the photometric operation for a subsequent shot is started, and when the photometric operation and the exposure calculation are completed and the winding-up operation of a film and a shutter are completed, a releasing operation in the subsequent shot is started. In general, since the photometric operation and exposure calculation are completed earlier than the winding operations of the film and shutter, the frame speed (the number of shots per unit time) in the continuous photographing mode is determined by the winding speed by the motor drive unit. However, if the winding speed of the motor drive unit is further raised and the winding operations of the film and shutter are completed before the photometric operation and exposure calculation are completed, the releasing operation in the subsequent shot is started after the apparatus waited for the completion of the photometric operation and exposure calculation. Eventually, even if the winding speed is raised, the frame speed is not raised in association therewith.

SUMMARY OF THE INVENTION

It is an object of the present invention to provide an apparatus in which when the winding speed is raised, the frame speed can be also raised in response thereto.

To accomplish the above object, according to an exposure control of the invention, upon completion of the winding operations of a film and a shutter, even if the photometric operation and the exposure calculation are not finished, the subsequent releasing operation is executed without waiting for the completion of those operations.

In the automatic exposure control according to invention, when the photometric operation is not finished upon completion of the winding operations of the film and shutter, the next releasing operation and the exposure calculation are executed on the basis of the control value which was controlled by the previous frame. In the case where the winding speed is slightly slow and upon completion of the winding operation, although the photometric operation has been completed, the exposure calculation is not completed, the releasing operation and the exposure calculation in the subsequent second shot are executed on the basis of the control value which was controlled by the previous frame (the first shot). In the third shot in which the exposure calculation based on the new photometric value was completed, the releasing operation and the exposure calculation are executed on the basis of the control value obtained here. In this manner, by always executing the releasing operation just after completion of the winding operation, the frame speed is not reduced.

DETAILED DESCRIPTION OF THE PREFERRED EMBODIMENTS

Figure 1:
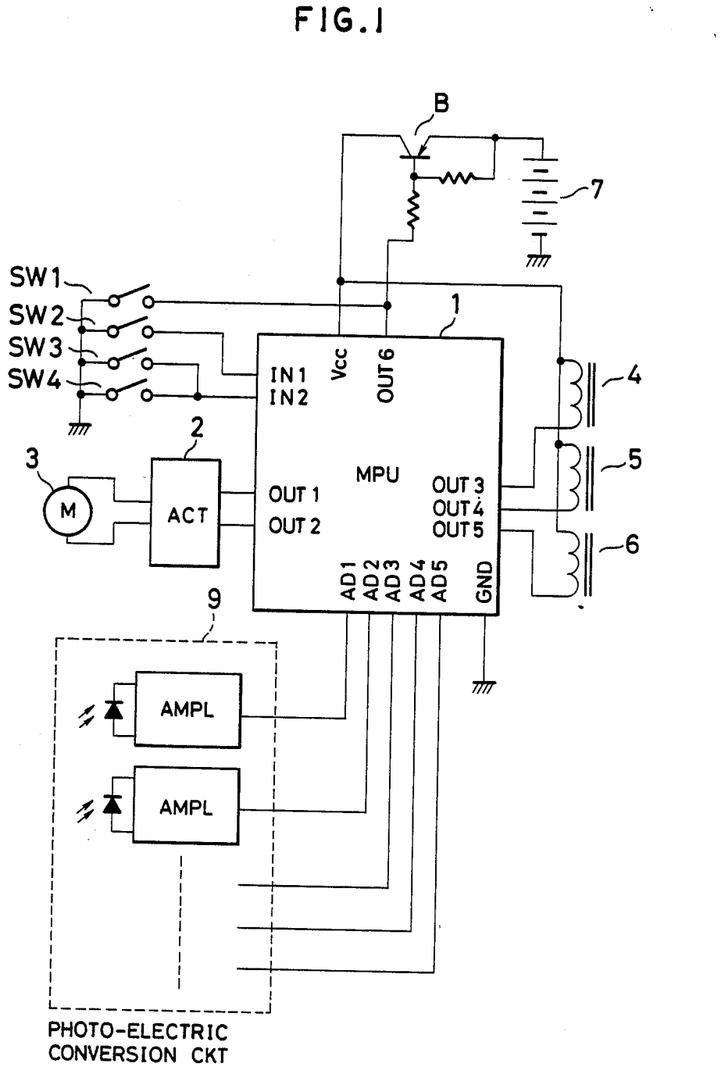
FIG. 1 is a circuit diagram of an embodiment of the present invention.

FIG. 1 is a circuit diagram showing an embodiment of the present invention. Reference numeral 1 denotes a well-known one-chip microcomputer unit (hereinafter, abbreviated to an MPU) having input ports $IN_1$ and $IN_2$ with pull-up resistors, output ports $OUT^1$ to $OUT_6$, and input ports $AD_1$ to $AD_5$ for A/D conversion. Reference numeral 2 denotes a motor drive circuit to drive a winding motor 3 for charging a mechanism such as a shutter and the like and for winding a film in accordance with the states of the output ports $OUT_1$ and $OUT_2$ of the MPU 1 as shown in Table 1. Reference numeral 7 denotes a power source; 8 indicates a PNP transistor; 4 a release magnet; 5 a leading curtain magnet; and 6 a trailing curtain magnet. Reference numeral 9 indicates a photoelectric conversion circuit comprising a plurality of photo sensitive elements and a group of head amplifiers which are connected thereto. Outputs of the head amplifiers are respectively connected to the A/D input terminals $AD_1$ to $AD_5$ of the MPU 1. In the embodiment, the photo-electric conversion circuit has five photo sensitive elements, the screen of an object to be photographed (the photographing screen) is divided into five areas and the photometric processes are executed. $SW_1$ indicates a semi-depression switch and $SW_2$ denotes a release switch. When a release button (not shown) is depressed, the semi-depression switch $SW_1$ is first turned on. When the release button is further depressed, the release switch $SW_2$ is turned on. When the switch $SW_1$ is turned on, the PNP transistor 8 is turned on and a power source is supplied to the MPU 1, motor drive circuit 2, and photo-electric conversion circuit 9. When each of the switches other than the semi-depression switch $SW_1$ is turned on, the input ports $IN_1$ and $IN_2$ of the MPU 2 are respectively set to the L level and it is informed to the MPU 1 that each switch has been turned on. $SW_3$ denotes a trailing curtain switch which is turned on when the trailing curtain of the shutter has run (any one of the state at the start of the running, the state during the running, and the state of completion of the running can be applied) and which is turned off when the shutter is completely charged. $SW_4$ indicates a winding switch which is turned on when the winding motor is activated and which is turned off when the winding is completed.

TABLE 1

|   | OUT1 | OUT2 | State |
|---|------|------|-------|
| 1 | L | L | Off |
| 2 | L | H | Brake |
| 3 | H | L | Drive |
| 4 | H | H | Off |

Figure 2:
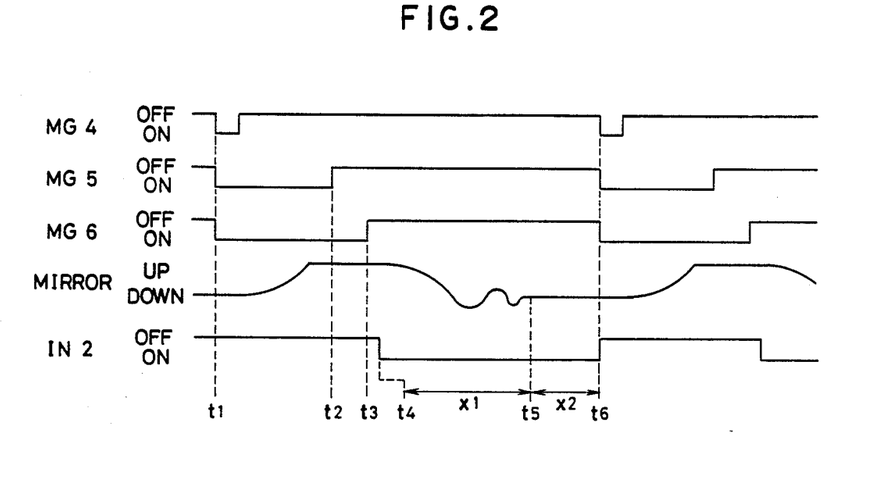
FIG. 2 is a timing chart of the embodiment.

FIG. 2 is a timing chart of the embodiment and shows voltage waveforms of the release magnet 4, leading curtain magnet 5, trailing curtain magnet 6, and input port $IN_2$ of the MPU 1 and an operating state of the main mirror, respectively.

Figure 3:
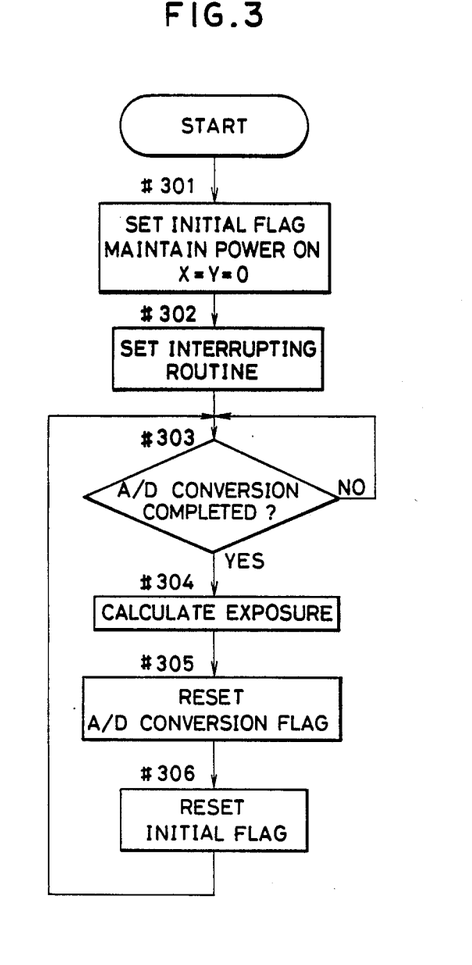
FIG. 3 is a flowchart for a main routine of the embodiment.
Figure 4:
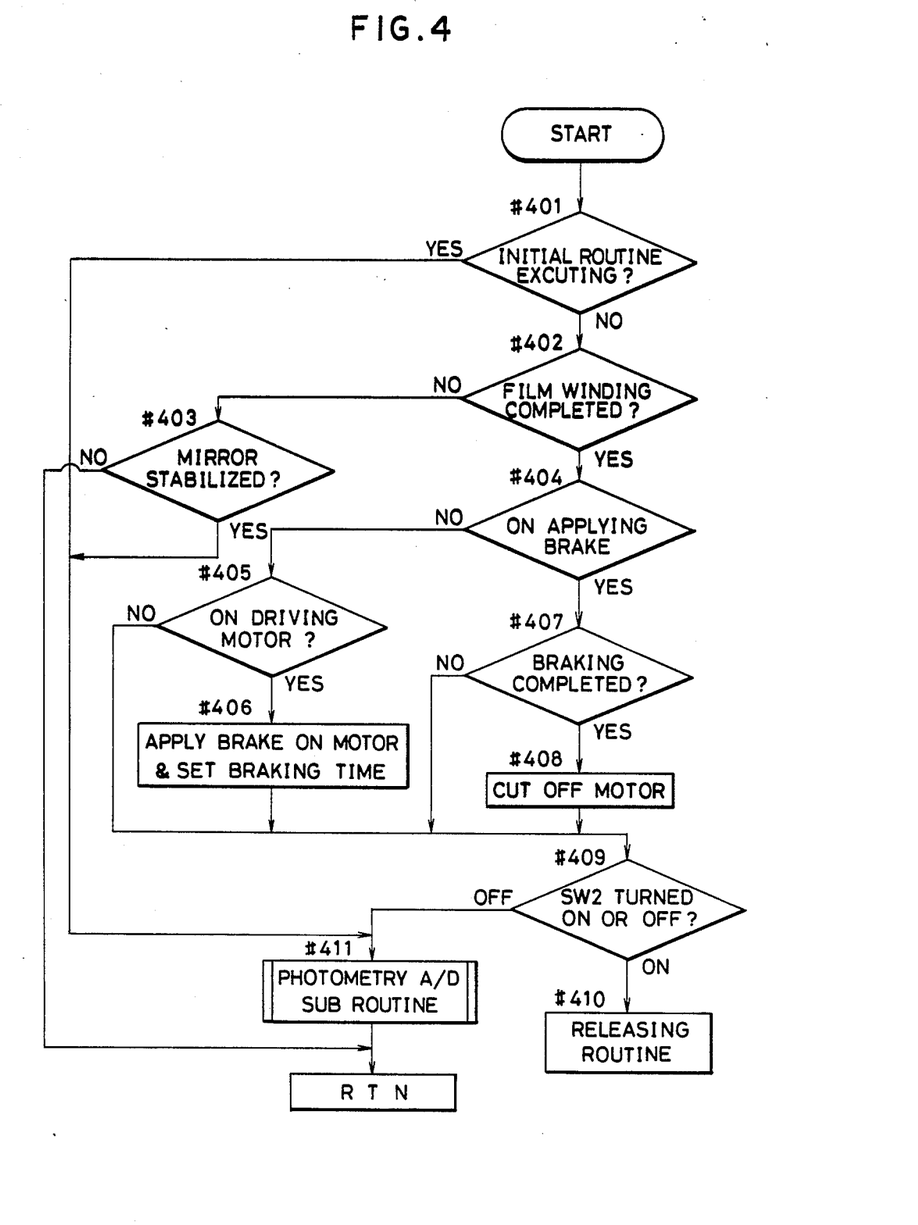
FIG. 4 is a flowchart for a timer interrupting routine of the embodiment.
Figure 5:
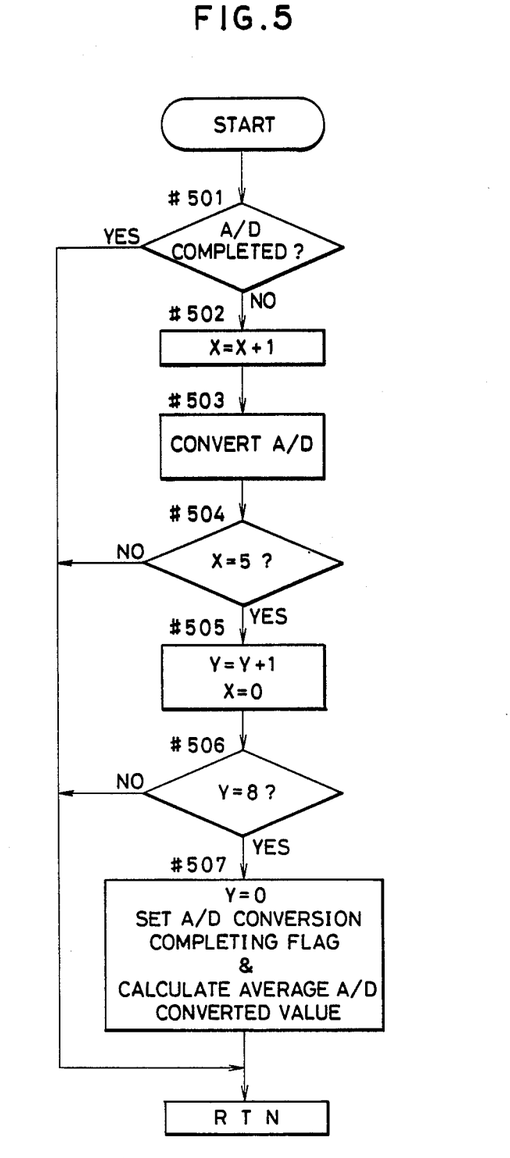
FIG. 5 is a flowchart for a subroutine of the A/D conversion of the embodiment.

FIGS. 3 to 6 are flowcharts showing the operation of the embodiment. FIG. 3 shows a main routine for setting the interrupting routine and executing the exposure calculation (in this case, they include the arithmetic operation for what is called a divisional photometry to obtain the luminance of an object to be photographed from five photometric values which are output from the five photo sensitive elements of the photo-electric conversion circuit 9, the APEX arithmetic operation to obtain the shutter speed and/or diaphragm value from the luminance of the object to be photographed and the sensitivity of the film) and the like. FIG. 4 shows a timer interrupting routine to execute the interrupting process every predetermined time (in the embodiment, every 0.5 msec) in parallel with the main routine. In the timer interrupting routine, the photometry A/D conversion is executed and the motor is controlled. FIG. 5 shows a subroutine for executing the photometry A/D conversion in the interrupting routine. If the A/D conversion has already been completed (#501) (in other words, if the photometric outputs regarding the five areas have already been A/D converted eight times, which will be explained hereinlater), no process is executed and the processing routine is returned to the timer interrupting routine. If the A/D conversion is not completed yet, "1" is added to a count value of a counter X (#502). The A/D conversion of the photometric output connected to the A/D input terminal corresponding to the count value of the counter X is executed and the result is stored into a memory in the MPU 1 (#503). If the count value of the counter X is not 5, the processing routine is directly returned to the timer interrupting routine (#504). If it is 5, this means that the five photometric outputs have been A/D converted, so that "0" is added to the count value of the counter X and "1" is added to a count value of a counter Y (#505). If the count value of the counter Y is not 8, the processing routine is returned. If it is 8, this means that the five photometric outputs have been A/D converted eight times, respectively. Then, the average value of each of the photometric outputs is obtained from the results of the A/D conversion of eight times with respect to the five photometric outputs and an A/D conversion completing flag is set to "1" (#507), thereby indicating that the exposure calculation can be executed. The reason why the A/D conversion is performed eight times is to obtain the average value of each of the five photometric outputs in step #507, respectively. The invention is not necessarily limited to eight times. The time interval from the start of the A/D conversion to the completion of the A/D conversion (that is, until the A/D conversion completing flag is set) is set to 20 msec ($=8 \times 5 \times 0.5$) because the A/D conversion is executed once every execution of the timer interrupting routine.

Figure 6:
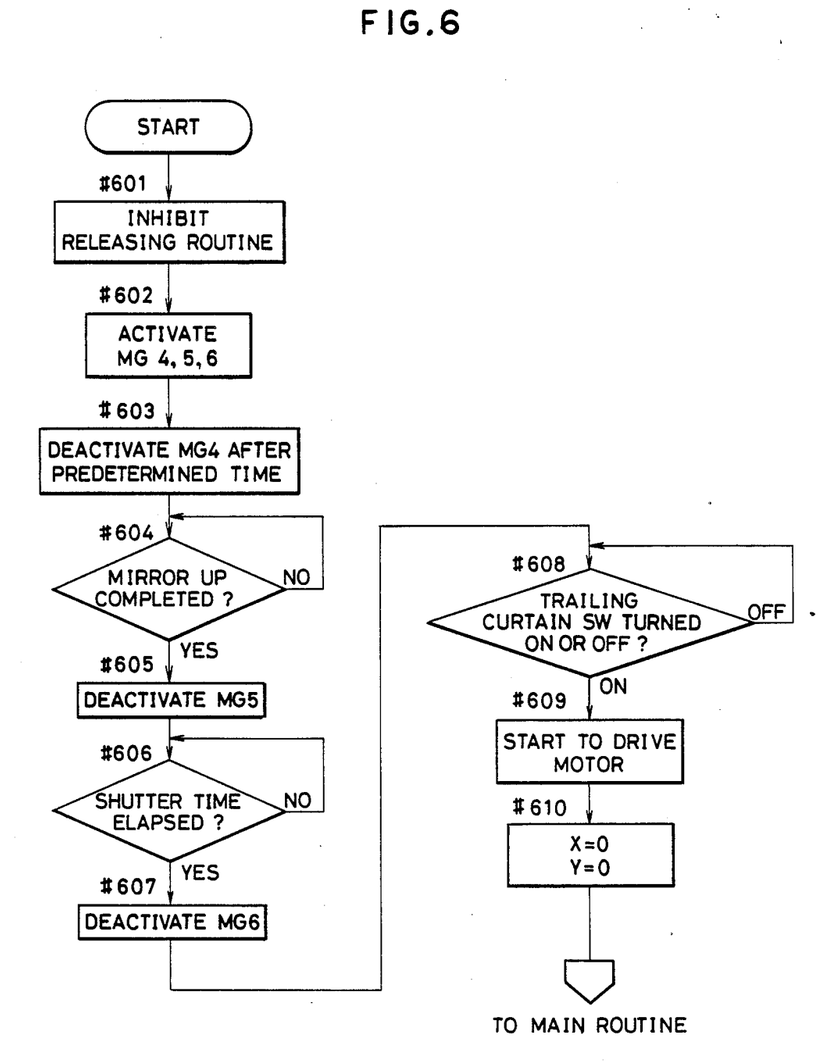
FIG. 6 is a flowchart for a releasing routine of the embodiment.

FIG. 6 shows a releasing routine for executing the mirror-up operation, shutter operation, mirrordown operation, charging operation, and start of the winding. The operation will now be described hereinbelow with reference to the above flowcharts. (Operation when the power source is on)

When the release button is depressed and the semidepression switch $SW_1$ is turned on and the power source is supplied, the MPU 1 first starts to execute the flow of FIG. 3 and sets an initial flag to indicate that the processing routine is set to the initial routine, then the MPU 1 sets the output port $OUT_6$ to the L level and turns on the PNP transistor 8 and, thereafter, keeps this state and sets the count values of the counters X and Y for A/D conversion to "0" (#301). The timer (not shown) provided in the MPU 1 is set, thereby enabling the timer interrupting routine of FIG. 4 to be executed every predetermined time (#302). The MPU 1 waits until the A/D conversion is completed (that is, until the A/D conversion completing flag is set) in the interrupting routine (#303). However, at this time, so long as the timer interrupting routine lies within the initial routine (#401), the subroutine for the photometry A/D conversion (#411) is performed and the processing routine is returned to the main routine. The main routine waits for completion of the A/D conversion (until the A/D conversion completing flag is set). Thereafter, after the elapse of a predetermined time (0.5 msec), the interrupting routine executes the next A/D conversion. In this manner, the same operation is repeated until the completion of the A/D conversion. Upon completion of the A/D conversion, the exposure is calculated (#304) form the results of the A/D conversion. The A/D conversion completion flag is reset (#305), thereby allowing the next A/D conversion to be executed by the timer interrupting routine. When the exposure is calculated, the exposure control can be executed. Therefore, the initial flag is reset to "0" (#306) and the apparatus again waits for completion of the A/D conversion.

(Releasing Operation)

When the release switch $SW_2$ is turned on during the repetitive execution of steps #303 to #306 in the main routine, the interrupting routine determines that the initial routine (#401) →No, the completion of the film winding (#402) →Yes, on applying brake (#404) →No, on driving motor (#405) →No, and release switch $SW_2$ (#409) →ON and executes the releasing routine (#410). In the releasing routine, the timer interrupting routine is first inhibited (#601). The release magnet 4, leading curtain magnet 5, and trailing curtain magnet 6 are activated (#602) and the mirror-up operation is started (at time $t_1$ in FIG. 2). Due to the activation of the leading curtain magnet 5 and trailing curtain magnet 6, the members to retain the leading and trailing curtains are respectively adsorbed and the leading and trailing curtains are retained. After the elapse of a predetermined time after time $t_1$, the MPU 1 deactivates the release magnet 4 (#603). When the time at which the mirror-up operation can be regarded to be completed has come (#604), the leading curtain magnet 5 is deactivated (#605). The leading curtain is run (at time $t_2$ in FIG. 2). After the elapse of the shutter time obtained by the calculation of the exposure in step #304 (#606), the trailing curtain magnet 6 is deactivated (#607). The trailing curtain is run (at time $t_3$ in FIG. 2). When the trailing curtain runs, the trailing curtain switch $SW_3$ is turned on (#608, at time $t_4$ in FIG. 2). The output ports $OUT_1$ and $OUT_2$ of the MPU 1 are set to the third state shown in Table 1, thereby starting to drive the winding motor 3 (#609). The count values of the counters X and Y in the MPU 1 are set to "0" and the counter of the A/D conversion is reset (#610). The processing routine is returned to #302 of the main routine.

The explanation has been made above with respect to the example of what is called a "diaphragm priority automatic exposure control mode" in which the diaphragm values have previously set and the shutter speed is controlled so as to obtain the optimum exposure by the diaphragm value. However, the invention can be also applied to what is called a "shutter priority automatic exposure control mode" in which the shutter speeds have previously been set and the diaphragm value is controlled so as to obtain the optimum exposure by the shutter speed or so called a "program exposure control" in which a combination of the shutter speed and the diaphragm value to obtain the optimum exposure is automatically changed in accordance with the luminance of an object to be photographed.

(Winding Operation)

Since the mirror does not yet fall down just after the start of the driving of the winding motor, the operating mode is not the state in which the photometric operation can be executed. Therefore, the timer interrupting routine determines that the initial routine (#401) →No, film winding completed (#402) →No, and mirror stabilized (#403) →No, so that no process is executed. After the elapse of $X_1$ seconds from the start of the driving of the winding motor, the mirror falls down and the vibration of the mirror is also settled and the photometric operation can be executed. In other words, the photometric outputs are stabilized. Therefore, after step #403, the photometry A/D conversion subroutine in #411 (FIG. 5) is executed (at time $t_5$ in FIG. 2). Upon completion of the winding ($t_6$ in FIG. 2), the interrupting routine decides that the film winding has been completed in #402 and determines that on applying brake (#404) →No and that on driving motor (#405) →Yes, the output ports OUT$_1$ and OUT$_2$ are set into the second state shown in Table 1, the winding motor 3 is braked, and the braking time is set (#406). If the release switch SW$_2$ is on, the releasing routine (#410) is executed. If the release switch SW$_2$ is Off, the photometry A/D conversion subroutine is executed. In the timer interrupting routine, if it is determined that the braking end time of the winding motor 3 has come (#407), the winding motor 3 is deactivated (#408). If the release switch SW$_2$ is on in #410, the releasing routine is repeated and the photographing operation is continuously executed.

The exposure control of the second frame will now be described with respect to the cases where a time $X_2$ after the mirror was stabilized ($t_5$ in FIG. 2) until the next releasing operation is executed ($t_6$ in FIG. 2) is (1) shorter than the photometry A/D conversion time (20 msec), (2) longer than the photometry A/D conversion time but shorter than the exposure calculation end time, and (3) longer than the exposure calculation end time.

(1) When the time $X_2$ is shorter than the photometry A/D conversion time:

Since the photometry A/D conversion is not finished, the new exposure calculation in #304 is not executed. Therefore, since the previous exposure control value is not rewritten, the exposure is controlled by the previous control value.

(2) When the time $X_2$ is longer than the photometry A/D conversion time but shorter than the exposure calculation end time:

The photometry A/D conversion is finished and the average value of each photometric value is obtained. However, the new exposure calculation in #304 is not finished yet. Therefore, in a manner similar to the item (1), since the previous exposure control value is not rewritten, the exposure control is executed by the previous control value. However, the exposure is calculated by the average photometric values which have previously been obtained by the time after the trailing curtain of the second frame ran until the mirror is stabilized, thereby obtaining the exposure control value. Upon releasing of the third frame, the exposure is controlled by the control value obtained.

(3) When the time $X_2$ is longer than the exposure calculation end time:

In this case, since the new exposure control value is certainly obtained in #304 before the releasing in a manner similar to the conventional camera, the exposure is always controlled by the new exposure control value.

As described above, according to the invention, there are advantages such that even in the case where the photometry is impossible between the frames during the continuous photographing operation (speaking in detail, in the case where the A/D conversion based on the new photometric outputs after releasing is not completed), the photographing can be executed without reducing the frame speed, and that although the photometry can be executed (speaking in detail, when the A/D conversion based on the new photometric outputs after releasing has been completed), even if the exposure calculation is not finished until the next releasing (the second releasing), in the next releasing (the third releasing), the control is executed by the exposure control value in consideration of the result of the photometry, so that the photographing can be executed without reducing the frame speed.

What is claimed is:

1. An automatic exposure control apparatus of a camera, comprising:
   winding means for winding up a film after completion of the photographing;
   output means for outputting an exposure start signal with respect to completion of the winding-up of the film;
   exposure determining means for determining an exposure control value in response to the exposure start signal; and.
   exposure control means for controlling an exposure of the camera on the basis of said exposure control value determined,
   wherein said exposure control means previously stores at least one or more first exposure control values before the first photographing operation and, when the second photographing is executed before a second exposure control value is determined in response to a first exposure start signal which is output with regard to the first winding-up operation after completion of the first winding-up operation, the exposure control means executes the exposure control by the first exposure control value.

2. An apparatus according to claim 1, wherein said exposure determining means includes a photometric circuit and said photometric circuit executes a photometric process of an object to be photographed in response to the exposure start signal and determines the exposure control value on the basis of said photometric process,
   and said exposure control means executes the exposure control by the first exposure control value when the second photographing is executed before the second exposure control value is determined after the photometric process of the object to be photographed was started in response to the first exposure start signal which is output with respect to the completion of the first winding-up operation after the first winding-up operation had been completed.

3. An apparatus according to claim 1, wherein said exposure control means executes the exposure control by the second exposure control value when the second photographing is executed after the second exposure control value was determined.

4. An apparatus according to claim 1, wherein said exposure control means determines a shutter speed on the basis of the exposure control value.

5. An apparatus according to claim 1, wherein said exposure control means determines an opening degree of a diaphragm on the basis of the exposure control value.

6. An apparatus according to claim 1, wherein said output means outputs the exposure start signal after the mechanical vibration of a reflecting member provided in the camera which is caused in association with the photographing was attenuated.

* * * * *